United States Patent
Hashida et al.

(10) Patent No.: US 9,489,358 B2
(45) Date of Patent: Nov. 8, 2016

(54) DATA PROCESSING APPARATUS, INPUT SUPPORTING METHOD, AND PROGRAM

(75) Inventors: Naoki Hashida, Kawasaki (JP); Yuma Kuribayashi, Tokyo (JP); Naoto Ookubo, Yokohama (JP); Chisa Takeda, Yokohama (JP); Junko Hiraishi, Kawasaki (JP)

(73) Assignee: NTT DOCOMO, INC., Tokyo (JP)

( * ) Notice: Subject to any disclaimer, the term of this patent is extended or adjusted under 35 U.S.C. 154(b) by 411 days.

(21) Appl. No.: 13/697,068

(22) PCT Filed: May 9, 2011

(86) PCT No.: PCT/JP2011/060640
§ 371 (c)(1),
(2), (4) Date: Dec. 7, 2012

(87) PCT Pub. No.: WO2011/142308
PCT Pub. Date: Nov. 17, 2011

(65) Prior Publication Data
US 2013/0091426 A1    Apr. 11, 2013

(30) Foreign Application Priority Data
May 10, 2010    (JP) .................. 2010-108399

(51) Int. Cl.
*G06F 17/22*    (2006.01)
*G06F 17/24*    (2006.01)
*G06F 3/023*    (2006.01)
*G06Q 10/10*    (2012.01)

(52) U.S. Cl.
CPC ............. *G06F 17/24* (2013.01); *G06F 3/0233* (2013.01); *G06F 3/0237* (2013.01); *G06F 17/243* (2013.01); *G06Q 10/107* (2013.01)

(58) Field of Classification Search
CPC ...... G06F 17/21; G06F 3/018; G06F 3/0233; G06F 3/0237; G06F 17/30985; G06F 17/24; G06F 17/243; G06Q 10/107
USPC .......................................... 715/261
See application file for complete search history.

(56) References Cited

U.S. PATENT DOCUMENTS 6,291,785 B1 *    9/2001    Koga .................. G06K 9/00469
                                                209/584
6,470,091 B2 *   10/2002    Koga .................. G06K 9/00469
                                                382/101

(Continued)

FOREIGN PATENT DOCUMENTS

EP    1808802 A1    7/2007
JP    2005-346416   12/2005

(Continued)

OTHER PUBLICATIONS

First Notification of Office Action for Chinese Application No. CN201180023119.5, dated Jul. 22, 2014.

(Continued)

*Primary Examiner* — Maikhanh Nguyen
(74) *Attorney, Agent, or Firm* — MKG, LLC (57) ABSTRACT

A communication terminal acquires an email, when an instruction to generate a memorandum is detected, specifies a character string associated with a predetermined attribute (a date and time, place, and person etc.), selects an input candidate from the specified character string and presents the selected candidate. For example, when a receive time of the email is "March 10th," and the email includes the character string "next day" in the text, the communication terminal presents the character string "March 11th" as an input candidate.

6 Claims, 7 Drawing Sheets

(56) References Cited

U.S. PATENT DOCUMENTS

| | | | | |
|---|---|---|---|---|
| 7,178,099 | B2* | 2/2007 | Meyer | G06Q 10/107 715/210 |
| 8,095,613 | B1* | 1/2012 | Perkowitz et al. | 709/207 |
| 8,307,281 | B2* | 11/2012 | Ueda | G06F 3/0237 715/261 |
| 8,730,173 | B2* | 5/2014 | Ishikawa | G06F 3/0237 345/156 |
| 2001/0021261 | A1* | 9/2001 | Koga | G06K 9/00469 382/101 |
| 2002/0026349 | A1* | 2/2002 | Reilly | G06Q 30/0243 705/14.55 |
| 2002/0126097 | A1* | 9/2002 | Savolainen | G06F 3/0237 345/168 |
| 2003/0051211 | A1* | 3/2003 | Fujisaki | G06Q 10/107 715/255 |
| 2003/0158903 | A1* | 8/2003 | Rohall et al. | 709/206 |
| 2009/0278853 | A1* | 11/2009 | Ueda | G06F 17/2735 345/581 |
| 2010/0235760 | A1* | 9/2010 | Goh | G06Q 10/107 715/752 |

FOREIGN PATENT DOCUMENTS

| | | | | |
|---|---|---|---|---|
| JP | 2005346416 A | * | 12/2005 | G06F 17/21 |
| JP | 2007-058476 | | 3/2007 | |
| JP | 2009-259144 | | 11/2009 | |

OTHER PUBLICATIONS

Notification of Reasons for Rejection issued in Japanese Patent Application No. 2010-108399 on Jun. 26, 2012 and English Translation Thereof.

Extended European Search Report issued in EP Application No. 11780565.5, date mailed Jul. 14, 2015, pp. 1-6.

European Communication pursuant to Article 94(3) EPC for European Patent Application No. 11780565.5-1955, dated Feb. 3, 2016.

European Communication pursuant to Rule 115(1) EPC for European Patent Application No. 11780565.5-1955, dated Aug. 3, 2016, pp. 1-7.

* cited by examiner

| | |
|---|---|
| Date : 6/27/2009 20:40 | |
| From : Mr.NOMURA ( nomura@dddd.ne.jp ) | |
| Cc  : matsuzaka@dddd.ne.jp | |
| Cc  : Mr.TARO SATO ( sato@dddd.ne.jp ) | |
| Title : DRINKING PARTY | |
| GOOD EVENING.  THIS IS NOMURA.<br>TOMORROW WE ARE GOING TO HAVE A MEETING IN<br>YOKOHAMA AT 7:00.  I HAVE MADE A RESERVATION AT<br>A PUB NAMED "OO-YA" LOCATED AT HIGASHI-GUCHI.<br>http://abcd.jp<br>abcd@mail.jp<br>045-1234-5678<br>WE WILL WAIT FOR 10 MINUTES AND THEN PROCEED<br>TO THE PUB; IF YOU ARRIVE LATE PLEASE CONTACT<br>Mr. SATO OR Mr. TANAKA. (tanaka@dddd.ne.jp)<br>BY THE WAY, DAY AFTER TOMORROW "6/29" IS MY<br>WIFE'S BIRTHDAY. | |

FIG. 8

| DISPLAYED NAME | EMAIL ADDRESS<br>TELEPHONE NUMBER |
|---|---|
| Mr. SATO | NO EMAIL ADDRESS<br>090-xxxx-1111 |
| TARO SATO | sato@dddd.ne.jp<br>090-xxxx-2222 |
| HANAKO SATO | hanako@dddd.ne.jp<br>090-xxxx-3333 |
| JIRO TANAKA | jiro@dddd.ne.jp<br>090-xxxx-4444 |
| Mr. NOMURA | nomura@dddd.ne.jp<br>090-xxxx-5555 |
| MA-KUN | tanaka@dddd.ne.jp<br>090-xxxx-6666 |
| WIFE | yome@dddd.ne.jp<br>090-xxxx-7777 |
| USER (ME) | yamasaki@dddd.ne.jp<br>090-xxxx-xxxx |

FIG. 9

| REFERENCE DATE AND TIME | 6/27/2009 20:40 |
|---|---|
| DATE AND TIME REPRESENTATION | 7:00, 6/29 |
| TIME ELEMENT | TOMORROW, 10 MINUTES, DAY AFTER TOMORROW |

FIG. 10

| HIGH | 6/27/2009 (REFERENCE DATE AND TIME) |
|---|---|
| | 6/29/2009 (DATE AND TIME REPRESENTATION) |
| | 6/28/2009 (REFERENCE DATE AND TIME + "TOMORROW") |
| | 6/29/2009 (REFERENCE DATE AND TIME + "DAY AFTER TOMORROW") |
| | 6/30/2009 (DATE AND TIME REPRESENTATION + "TOMORROW") |
| LOW | 7/1/2009 (DATE AND TIME REPRESENTATION + "DAY AFTER TOMORROW") |

FIG. 11

| HIGH | 20:40 (REFERENCE DATE AND TIME) |
|---|---|
| | 7:00 (DATE AND TIME REPRESENTATION) |
| | 19:00 (DATE AND TIME REPRESENTATION) |
| | 20:50 (REFERENCE DATE AND TIME + "10 MINUTES") |
| | 7:10 (DATE AND TIME REPRESENTATION + "10 MINUTES") |
| LOW | 19:10 (DATE AND TIME REPRESENTATION + "10 MINUTES") |

FIG. 12

| PLACE NAME | YOKOHAMA, HIGASHI-GUCHI, OO-YA |
|---|---|
| PLACE ELEMENT | PUB |
| GENERAL VOCABULARY | DRINKING PARTY, NOMURA, TOMORROW, 7:00, MEETING, RESERVATION, 10 MINUTES, YOU, SATO, TANAKA, CONTACT, DAY AFTER TOMORROW, 6/29, MY, WIFE, BIRTHDAY... |

*FIG. 13*

| HIGH | YOKOHAMA, HIGASHI-GUCHI, OO-YA (PLACE NAME) |
|---|---|
| | PUB (PLACE ELEMENT) |
| LOW | DRINKING PARTY, NOMURA...(GENERAL VOCABULARY) |

*FIG. 14*

| From/To/Cc EXCLUDING SELF-EMAIL ADDRESS | nomura@dddd.ne.jp, matsuzaka@dddd.ne.jp, sato@dddd.ne.jp |
|---|---|
| EMAIL ADDRESS IN TEXT | abcd@mail.jp, tanaka@dddd.ne.jp |
| TELEPHONE NUMBER IN TEXT | 045-1234-5678 |
| PERSON'S NAME | NOMURA, YOKOHAMA, HIGASHI-GUCHI, SATO, TANAKA, |
| PERSON ELEMENT | YOU, MY, WIFE |
| GENERAL VOCABULARY | DRINKING PARTY, TOMORROW, 7:00, MEETING, PUB, OO-YA RESERVATION, 10 MINUTES, CONTACT, DAY AFTER TOMORROW, 6/29, BIRTHDAY |

*FIG. 15*

| | |
|---|---|
| HIGH | nomura@dddd.ne.jp (FROM/TO/CC AND REGISTERED IN ADDRESS BOOK) |
| | sato@dddd.ne.jp (FROM/TO/CC AND REGISTERED IN ADDRESS BOOK) |
| | tanaka@dddd.ne.jp (EMAIL ADDRESS IN TEXT AND REGISTERED IN ADDRESS BOOK) |
| | matsuzaka@dddd.ne.jp (FROM/TO/CC AND UNREGISTERED IN ADDRESS BOOK) |
| | abcd@mail.jp (EMAIL ADDRESS IN TEXT AND UNREGISTERED IN ADDRESS BOOK) |
| | nomura@dddd.ne.jp (PERSON'S NAME (NOMURA) AND REGISTERED IN ADDRESS BOOK) |
| | 090-xxxx-1111 (PERSON'S NAME (SATO) AND REGISTERED IN ADDRESS BOOK) |
| | sato@dddd.ne.jp (PERSON'S NAME (SATO) AND REGISTERED IN ADDRESS BOOK) |
| | hanako@dddd.ne.jp (PERSON'S NAME (SATO) AND REGISTERED IN ADDRESS BOOK) |
| | jiro@dddd.ne.jp (PERSON'S NAME (TANAKA) AND REGISTERED IN ADDRESS BOOK) |
| | yome@dddd.ne.jp (PERSON ELEMENT (WIFE) AND REGISTERED IN ADDRESS BOOK) |
| | 045-1234-5678 (TELEPHONE NUMBER IN TEXT AND UNREGISTERED IN ADDRESS BOOK) |
| | YOKOHAMA, HIGASHI-GUCHI...(PERSON'S NAME AND UNREGISTERED IN ADDRESS BOOK) |
| | YOU, MY...(PERSON ELEMENT AND UNREGISTERED IN ADDRESS BOOK) |
| LOW | DRINKING PARTY, TOMORROW...(GENERAL VOCABULARY) |

FIG. 16

DATA PROCESSING APPARATUS, INPUT SUPPORTING METHOD, AND PROGRAM

TECHNICAL FIELD

The present invention relates to a method of supporting input of information by a user.

BACKGROUND ART

Japanese Patent document No. JP-A-2009-259144 describes a technology for extracting date and time information and content information (including information on a place, a subject, and a requirement) from a content of an email, and for reflecting the extracted date and time information and content information as a candidate for registration in a schedule. JP-A-2009-259144 also describes that this technology allows a user to reduce input operations and to register the schedule precisely and quickly.

SUMMARY OF THE INVENTION

However, when information merely is extracted from a content of an email, the information may be not useful.

Thus, an object of the present invention is to present information that is likely to be input by a user as an input candidate in a case of supporting user input.

A data processing apparatus according to an embodiment of the present invention includes: a reference specifying unit that specifies a reference date and time used when an input candidate associated with a date and time is estimated, based on data including a character string and date and time information; a character string specifying unit that specifies a character string associated with a date and time from the character string included in the data; an estimating unit that estimates an input candidate associated with a date and time using the date and time specified by the reference specifying unit and the character string specified by the character string specifying unit; and a presenting unit that presents to a user the input candidate estimated by the estimating unit.

In a preferred embodiment, the character string specifying unit specifies a first character string that represents an absolute or direct date and time and a second character string that represents a relative or indirect date and time; and the presenting unit presents an input candidate estimated using the first character string prior to an input candidate estimated using the second character string.

In another preferred embodiment, the estimating unit sets the reference date and time to a first input candidate, and sets a date and time that is a combination of the reference date and time and the specified character string to a second input candidate; and the presenting unit presents the first input candidate prior to the second input candidate.

An input supporting method according to another embodiment of the present invention, which method is performed by a data processing apparatus and is characterized in: specifying a reference date and time used when an input candidate associated with a date and time is determined, based on data including a character string and date and time information; specifying a character string associated with a date and time from the character string included in the data; estimating an input candidate associated with a date and time using the specified date and time and the specified character string; and presenting to a user the estimated input candidate.

A program according to another embodiment of the present invention, which program causes a computer to perform the steps of: specifying a reference date and time used when an input candidate associated with a date and time is determined, based on data including a character string and date and time information; specifying a character string associated with a date and time from the character string included in the data; estimating an input candidate associated with a date and time using the specified date and time and the specified character string; and presenting to a user the estimated input candidate.

According to the present invention, it is possible to present information that is likely to be input by a user as an input candidate in a case of supporting a user input.

DESCRIPTION OF REFERENCE NUMERALS

10: Communication Terminal
100: Control Unit
110: Mail Acquiring Unit
120: Address Acquiring Unit
130: Date And Time Specifying Unit
131: Reference Specifying Unit
132: Character String Specifying Unit
133: Estimating Unit
140: Place Specifying Unit
150: Person Specifying Unit
160: Presenting Unit
200: Memory Unit 300: Communication Unit
400: Display Unit
500: Input Unit

DETAILED DESCRIPTION

[Embodiment]

Figure 1:
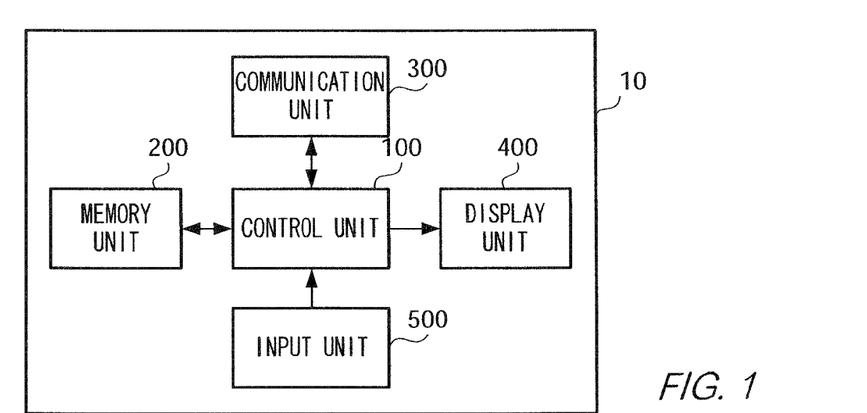
FIG. 1 is a block diagram showing a configuration of a communication terminal.

FIG. 1 is a block diagram showing a configuration of a communication terminal that is an embodiment of the present invention. As shown in FIG. 1, communication terminal 10 of the present embodiment includes control unit 100, memory unit 200, communication unit 300, display unit 400, and input unit 500. Communication terminal 10 is, for example, a wireless communication terminal such as a mobile phone and a smart phone; however, communication terminal 10 is not limited to a device performing wireless communications. Communication terminal 10 has at least functions for voice communications (namely a telephone call) and data communications. "Data communications" is used here to refer to at least sending and receiving an email.

In the present embodiment, the email refers to an electronic message that is exchanged among communication terminals according to a predetermined protocol such as a Simple Mail Transfer Protocol (SMTP) in conformity to Request for Comments (RFC). The email may include in addition to an email body, typical header information (Received, Data, From, To, Cc, Bcc, and Subject etc.). The email may also include a separate file (attached file).

Control unit 100 corresponds to an example of the data processing apparatus according to the present invention. Control unit 100 includes an arithmetic processing unit such as a Central Processing Unit (CPU), and a memory corresponding to a main memory, and controls an operation of various units of communication terminal 10 by executing a program. In addition, control unit 100 has a clock function (function for measuring time). Memory unit 200 includes a memory means corresponding to an auxiliary storage, and stores data used by control unit 100. The data stored in memory unit 200 includes an email, address book, sending and receiving history, incoming and outgoing history, and dictionary. It is to be noted that a whole or a part of the memory means included in memory unit 200 may be a removable media (that is removable memory means).

In the present embodiment, each of the address book, sending and receiving history, and incoming and outgoing history is a set of data (data constellation) including address information. The address information referred to here, is data representing a candidate or history of a source of communications (communication terminal on a side to start communications) or a destination of communications (communication terminal to be another side of the communications). The address information is data representing at least one of a telephone number, email address, and name assigned to that information for convenience. In the present embodiment, the telephone number is a predetermined number of a numerical string used for a telephone call. The email address is a character string used for sending and receiving an email. The name is a character string used for representing a source or destination of communications such that a user can recognize easily the source or destination. The name is a person's name, nickname, store name, or corporate name etc.

The address book is data constellation recording address information used by a user of communication terminal 10 for an outgoing call and sending an email. The address information recorded in the address book can become a candidate for a source or destination of communications.

The sending and receiving history is data constellation in which address information and a send time or receive time are associated and recorded for each email sent from or received at communication terminal 10 previously. The incoming and outgoing history is data constellation in which address information and an outgoing time or incoming time are associated and recorded for each outgoing or incoming call performed in communication terminal 10 previously. The address information recorded in the sending and receiving history or incoming and outgoing history is a history in which information on a source or destination of communications and information on a time are associated with each other. It is to be noted that the sending and receiving history (incoming and outgoing history) may be divided into a sending history (outgoing history) and receiving history (incoming history).

In the present embodiment, the dictionary is data constellation including plural character strings. In the dictionary of the present embodiment, the character strings with a predetermined attribute are corrected and classified according to a given rule, such as a name dictionary and a dictionary of geographical names. In the dictionary of the present embodiment, character strings corresponding to a synonym or quasi-synonym may be associated and recorded, such as in a thesaurus. It is to be noted that a character string included in the dictionary may be assigned or added by a user. Details of the dictionary of the present embodiment are described later.

Communication unit 300 is an interface for data communications and a telephone call between communication terminal 10 and another communication terminal. Communication unit 300 sends or receives data via a predetermined communication network such as the Internet and a mobile communication network. However, communication unit 300 may send or receive data directly to or from another communication terminal without use of the communication network, depending on a type of an electronic message. Display unit 400 includes a display means such as a liquid crystal panel and driving means for driving the display means, and displays an image. Input unit 500 receives an operation (namely an input) performed by a user of communication terminal 10, and supplies to control unit 100 operation information representing the received operation. Input unit 500 may receive the user operation by a keypad (keyboard), or may receive the user operation by a touch sensor (touch screen) provided on the display means of display unit 400.

The hardware configuration of communication terminal 10 is as described above. Under the configuration, communication terminal 10 performs data communications and a telephone call with another communication terminal (not shown). When a user starts a telephone call from the user's side that serves as a source of an outgoing call (source of communications), the user can input directly a telephone number of a destination of the outgoing call (destination of communications), and can also select the telephone number recorded in the address book or incoming and outgoing history thereby reducing input operations. When communication terminal 10 makes an outgoing call to a destination of the outgoing call having a predetermined telephone number, communication terminal 10 records a telephone number and an outgoing time to the incoming and outgoing history. On the other hand, when communication terminal 10 receives an incoming call from another communication terminal, and a telephone number of a source of the call is recorded in the address book, communication terminal 10 displays a name assigned to the telephone number on display unit 400 to enable a user to recognize with ease the source (who or where) of the call. In addition, when communication terminal 10 receives an incoming call from a source of an outgoing call having a predetermined telephone number, communication terminal 10 records a telephone number and incoming time to the incoming and outgoing history.

Also, communication terminal 10 can send or receive an email in data communications. When communication terminal 10 sends an email, communication terminal 10 displays a screen for generating the email on display unit 400, and receives an input such as characters by a user. At this time the user directly can input an email address of a destination (destination of communications), and can also select the email address recorded in the address book or sending and receiving history thereby reducing input operations. On the other hand, when communication terminal 10 receives an email, and an email address of a source of sending (source of communications) is recorded in the address book, communication terminal 10 may display a name assigned to the email address on display unit 400. Also, when communication terminal 10 sends or receives an email, communication terminal 10 records an email address and send time or receive time to the sending and receiving history as in the case of the telephone call.

Further, when communication terminal 10 receives an email, communication terminal 10 can generate a document based on a content of the received email. "Document" referred to here, may be data constellation associated with a specific application (for example a scheduler), or may be data constellation without limitation of a use or application. The document generated based on the received email is referred to as a "memorandum" in the following description.

Figure 2:
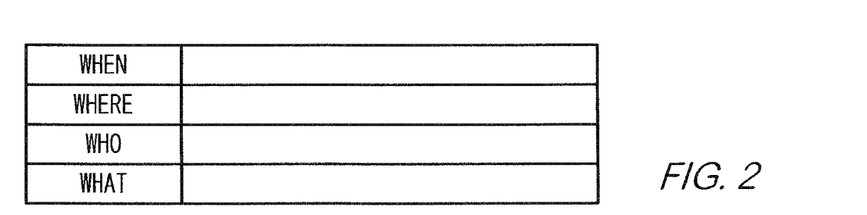
FIG. 2 is a diagram showing an example of a data format of a memorandum.

FIG. 2 is a diagram showing an example of a data format of the memorandum in the present embodiment. As shown in FIG. 2, the memorandum of the present embodiment includes four types of items "when," "where," "who," and "what." The item "when" with an attribute associated with a date and time referred to here, is an item in which a date and time or only time is input. The "date and time" and "time" referred to here, can include in addition to a concrete date and time, information such as "two hours later" and "tomorrow." The item "when" can be used for in addition to a time of a schedule in a scheduler, a time at which an alarm is rung. The item "where" with an attribute associated with a place is an item in which a name of a place is input. The item "who" with an attribute associated with a person is an item in which a name of a person etc. is input. The "person" referred to here, can include both of a natural person and a juridical person. The item "what" without a particular attribute (hereinafter, referred to as "no attribute") is an item in which information not corresponding to any attribute described above or information whose attribute is unknown or indefinite, is input.

By using such a memorandum, the user can input information such as "when, where, who (or with whom/whom), what I do." It is to be noted that in the memorandum information does not have to be input in all items. Information may be described only in a part of the items, for example, items "when and where" or "with whom and what I do."

Communication terminal 10 supports an input performed by a user when the user generates such a memorandum. At this time, communication terminal 10 analyses a received email, and classifies character strings included in the email based on the foregoing attribute, and presents a character string that satisfies a predetermined condition of the character strings as an input candidate of each item of the memorandum. That is, the input candidate is a character string that is likely to correspond to a certain item. The character string referred to here, is a single character or a set of plural characters. The character refers to a code that is represented by a predetermined character code. The character can include in addition to a general character (Chinese character, alphabet etc.), a number, and a symbol.

Figure 3:
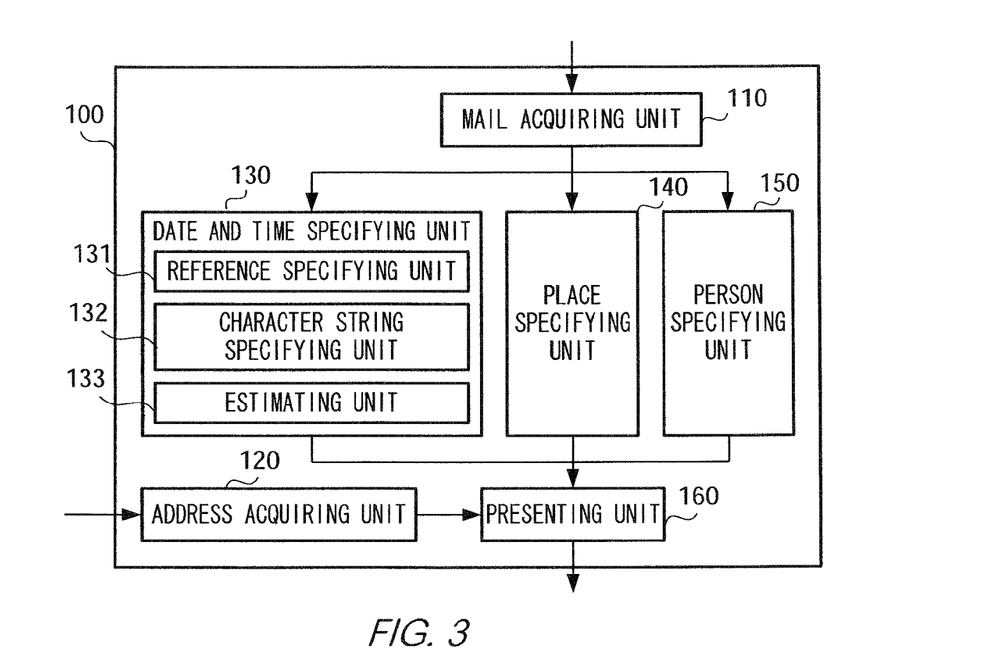
FIG. 3 is a functional block diagram showing a functional configuration of an input support by a control unit.

FIG. 3 is a functional block diagram showing the functional configuration regarding an input support by control unit 100. Control unit 100 implements functions corresponding to mail acquiring unit 110, address acquiring unit 120, date and time specifying unit 130, place specifying unit 140, person specifying unit 150 and presenting unit 160 shown in FIG. 2 by executing a program. These functions may be implemented as a part of a function of an Operating System (OS), or may be implemented as a function of a dedicated application.

Mail acquiring unit 110 acquires data to be analyzed (namely an email) via communication unit 300 or memory unit 200. Mail acquiring unit 110 may acquire a single email (for example, an email with the latest receive time) to be analyzed, or may acquire plural emails to be analyzed. In the latter case, mail acquiring unit 110 retrieves and acquires an email recorded in memory unit 200.

Address acquiring unit 120 acquires at least one of a data constellation including address information (an address book, sending and receiving history and incoming and outgoing history). In the present embodiment, address acquiring unit 120 acquires only the address book. The address book is used when an input candidate associated with a person is presented. In other words, the address book is data not required when input candidates associated with a date and time and place are presented.

Date and time specifying unit 130 specifies a character string associated with a date and time based on the email acquired by mail acquiring unit 110. In more detail, date and time specifying unit 130 includes reference specifying unit 131, character string specifying unit 132, and estimating unit 133.

Reference specifying unit 131 specifies a reference date and time used when an input candidate associated with a date and time is specified. The reference date and time is, for example, either a send time or a receive time of en email. In this case, the send time or receive time is an example of the date and time information according to the present invention. The reference date and time may also be a generated time (date and time at which a screen for generating a memorandum is displayed) or edited time (date and time at which a screen for changing a content of the generated memorandum is displayed) of the memorandum. "Date and time at which a screen is displayed" referred to here, may be a time from which the screen is started to be displayed, or may be a time at which the displayed screen is hidden. That is, the "date and time at which a screen is displayed" may be any period of time in which the screen is displayed. The generated time and edited time also correspond to an example of the date and time information according to the present invention.

Character string specifying unit 132 specifies a character string associated with a date and time based on the email acquired by mail acquiring unit 110. Estimating unit 133 estimates an input candidate associated with a date and time using the reference date and time specified by reference specifying unit 131 and the character string specified by character string specifying unit 132.

Place specifying unit 140 specifies a character string associated with a place based on the email acquired by mail acquiring unit 110. Person specifying unit 150 specifies a character string associated with a person based on the email acquired by mail acquiring unit 110. Presenting unit 160 presents to a user the character string specified by date and time specifying unit 130, place specifying unit 140 or person specifying unit 150 as an input candidate of an item corresponding to each attribute of the memorandum.

Presenting unit 160 preferably presents a character string satisfying a predetermined condition prior to another character string, instead of presenting all specified character strings. A state in which a character string satisfies a predetermined condition referred to here, is a state in which the character string has a priority, which is described later, that is higher than a priority of another character string. It is to be noted that when presenting unit 16 presents an input candidate associated with a person, presenting unit 160 determines referring of the data constellation acquired by address acquiring unit 120 on a priority based on a degree of coincidence between the specified character string and the data constellation.

The presentation referred to here, is showing of information such that a user can recognize. In the present embodiment, the presentation indicates a display (visually present) of a character string. Therefore, in the present embodiment, display unit 400 corresponds to a presenting means. A method of presenting an input candidate includes the first method of displaying an input candidate in an item in advance (without a direct input by a user), and the second method of displaying plural input candidates as a whole or a part of an option of an item. Communication terminal 10 employs either of the methods as appropriate. In the first method, when the input candidate is not a character string desired by a user, the user deletes the character string, and performs an operation to input another character string. It is to be noted that presenting unit 114 preferably employs the second method when there are plural input candidates.

Figure 4:
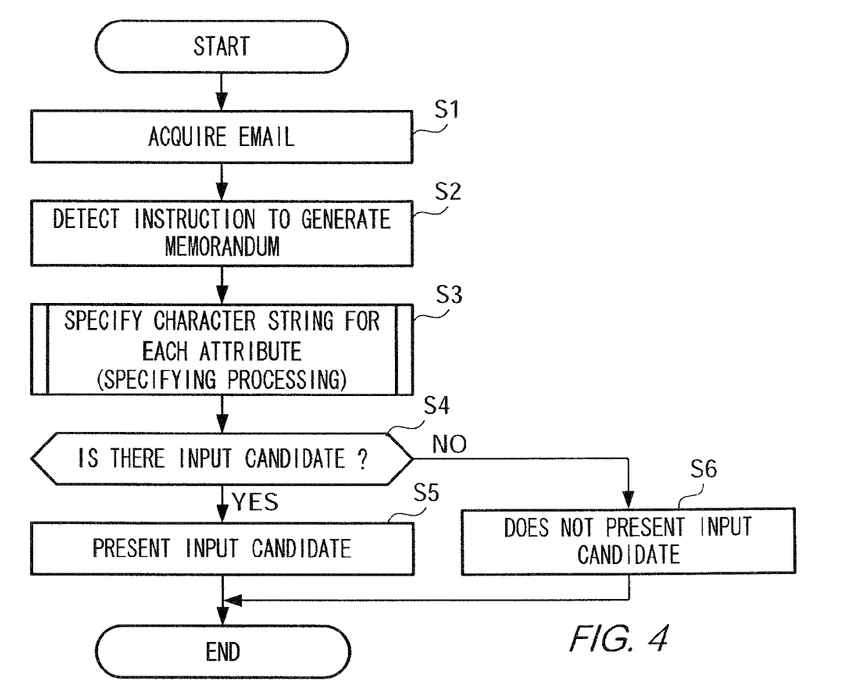
FIG. 4 is a flowchart showing a brief operation of an input support.

FIG. 4 is a flowchart showing a brief operation of an input support of communication terminal 10. As shown in FIG. 4, control unit 100 of communication terminal 10 firstly acquires a received email (step S1). Then, control unit 100 detects an instruction to generate a memorandum at an appropriate time (step S2). This instruction may be provided by a user operation, or may be generated by communication terminal 10 at a time at which communication terminal 10 receives the email.

It is to be noted that processing in step S1 may be executed after processing in step S2 is carried out. Namely, control unit 100 retrieves and acquires the email stored in memory unit 200 and specifies a character string after control unit 100 receives the instruction to generate the memorandum. However, when there are plural emails to be analyzed, it is preferable that control unit 100 executes processing in step S1 and S2 in advance at an idle time.

Upon detecting the instruction to generate the memorandum, control unit 100 specifies a character string associated with each attribute of the memorandum (step S3). This processing refers to "specifying processing" in the following description. The specifying processing includes four kinds of processing for specifying character strings associated with the respective attributes "date and time," "place," "person," and "no attribute." These processings are executed alternatively or in parallel. It is to be noted that in the processing for specifying a character string with no attribute, all character strings associated with three types of the attributes ("date and time," "place," "person") other than "no attribute" may be specified, or a character string other than a character string associated with the three types of the attributes may be specified.

Subsequently, control unit 100 determines whether there is a character string appropriate for an input candidate for each attribute of a memorandum (step S4). When there is an appropriate input candidate, the candidate is presented for each attribute by control unit 100 (step S5). Meanwhile, when there is no appropriate input candidate, no candidate is presented (step S6).

Figure 5:
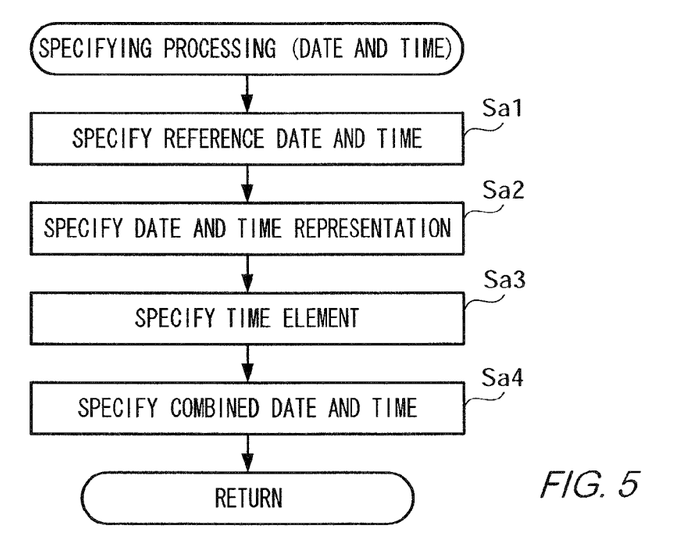
FIG. 5 is a flowchart showing specifying processing associated with a date and time.
Figure 6:
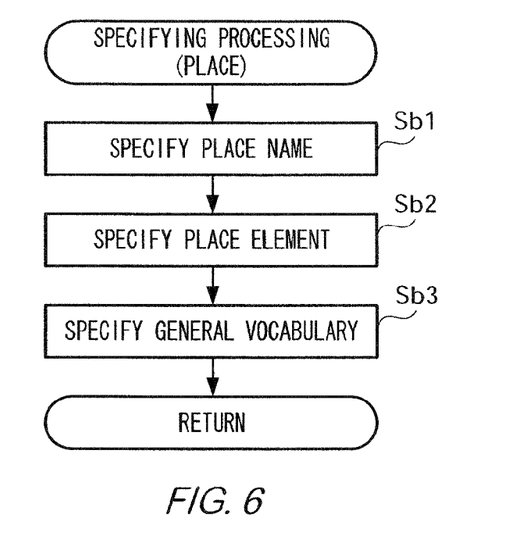
FIG. 6 is a flowchart showing specifying processing associated with a place.
Figure 7:
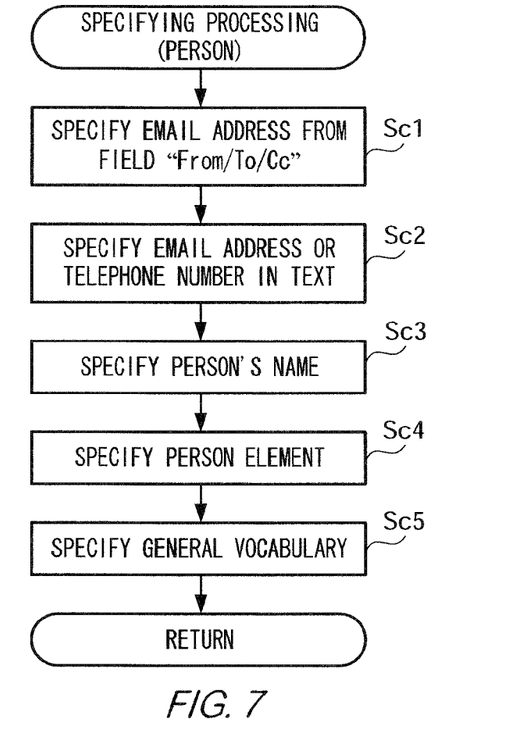
FIG. 7 is a flowchart showing specifying processing associated with a person.

FIGS. 5 to 7 are flowcharts showing the specifying processing. FIG. 5 is a flowchart showing processing for specifying a character string associated with a date and time, which processing is included in the specifying processing. In the processing, control unit 100 specifies a reference date and time (step Sa1), and then specifies a character string associated with a date and time from a body and subject of the email (step Sa2, Sa3). It is to be noted that the body and subject of the email are collectively referred to as "text" in the following description. When the email includes an attached file, control unit 100 may also specify the character string from the attached file.

In the present embodiment, the character string associated with the date and time is divided into two types of character strings "date and time representation" and "time element." The date and time representation referred to here, is a character string representing a direct date and time. For example, the date and time representation is a character string representing a date and time as a concrete numerical value such as character strings "March 10th," and "21:15." In contrast, the time element is a character string representing an indirect date and time. For example, the time element is a character string such that a concrete date and time is specified by a reference date and time, such as character strings "next day," and "two hours before." The meaning of the character string "next day" is changeable depending on a reference date, for example, the day after "March 10th" is "March 11th," and the day after "March 11th" is "March 12th." In that sense, the time element may also be a character string representing a length of time relative to the reference date and time. In contrast, since the date and time representation represents a concrete date and time, the date and time representation may also be a character string representing a date and time without a limitation of any other information (namely absolutely). Thus, the date and time representation is an example of the first character string according to the present invention, and the time element is an example of the second character string according to the present invention.

Control unit 100 specifies the date and time representation in step Sa2, and specifies the time element in step Sa3. Control unit 100 uses a known morphological analysis for specifying the date and time representation. It is to be noted that when the date and time representation represents only a day and a month, and a year cannot be specified, control unit 100 substitutes a year of the reference date and time. In addition, control unit 100 uses a dictionary describing time elements (a dictionary of time elements) when control unit 100 specifies the time element. Namely, at this time control unit 100 deems a character string consistent with a character string included in the dictionary of time elements to be a time element, which character string is included in a character string contained in the text of the email.

Upon specifying the reference date and time, date and time representation and time element, control unit 100 specifies a date and time that is a combination of the reference date and time and the time element, and a date and time that is a combination of the date and time representation and the time element (step Sa4). For example, when the date and time representation is "March 10, (2010)" and the time element is "next day," the date and time "March 11, (2010)" is specified here.

Control unit 100 assigns a priority to the date and time specified in this step. Specifically, control unit 100 assigns the priority in an order described below:
(1) The reference date and time
(2) The date and time representation
(3) The combination of the reference date and time and the time element
(4) The combination of the date and time representation and the time element.
In this example, (1) has the highest priority, (4) has the lowest priority. It is to be noted that when plural date and time representations or time elements are included in the text, priorities may be determined in a predetermined appropriate order (order starting from beginning of data, or an ascending-order or descending-order of the numerical value etc.). Control unit 100 determines an order to present the input candidate using a priority assigned in this manner.

FIG. 6 is a flowchart showing processing for specifying a character string associated with a place, which processing is included in the specifying processing. In the processing, control unit 100 specifies character strings "place name," "place element," and "general vocabulary" from the text of the email (step Sb1, Sb2, Sb3). The place name referred to here, is a noun representing a particular place, for example, a name of a district or a local public body (a city, ward, town or village), a geographical name (Mt. Fuji etc.), a name of a station or airport, a name of a company or facility (a store, a public facility etc.) or a name of a well-known landmark or meeting place. In contrast, the place element is a noun representing a place, and represents the place in a more abstract or general manner than the place name. The place element is a character string such as a "bar," "restaurant," and "in front of the station." The general vocabulary is a character string other than the place name and place element of a character string included in the text. Dedicated dictionaries (a dictionary of geographical names, and a dictionary of place elements) are used for specifying the place name and place element, respectively. In other words, a character string associated with a place is determined as to whether it belongs to the place name or a place element depending on the character strings registered (described) in the dictionary of geographical names, and the dictionary of place elements.

Control unit 100 assigns a priority to the character string specified in this step. Specifically, control unit 100 assigns the priority in an order described below:
(1) The place name
(2) The place element
(3) The general vocabulary
In this example, (1) has the highest priority, (3) has the lowest priority. It is to be noted that when plural place names or place elements are included in the text, priorities may be determined in a predetermined appropriate order.

FIG. 7 is a flowchart showing a processing for specifying a character string associated with a person, which processing is included in the specifying processing. In this processing, control unit 100 specifies an email address described in the fields "From," "To" and "Cc (including Bcc)" of the header information of the email (step Sc1). However, when the email address assigned to the self-terminal is included in the email address to be specified, the email address is excluded from the email address to be specified. In other words, in step Sc1 an email address other than the user's own email address is specified from the email addresses of an email sent or received by users.

Next, control unit 100 specifies an email address or a telephone number included in the text (step Sc2). Known methods are used for specifying the email address or a telephone number. For example, when the symbol "@" is included in the text, and at least a predetermined number of an alphanumeric character is located before or after the symbol, this alphanumeric character may be deemed to be an email address.

Sequentially, control unit 100 specifies character strings "person's name," "person element," and "general vocabulary," included in the text, respectively (step Sc3, Sc4, Sc5). The person's name referred to here, is a noun representing a person, for example a family name or a first name, or a name of a celebrity (including a stage name and nickname) etc. In contrast, the person element is a character string other than the person's name described above of a noun associated with a person, for example, a personal pronoun. For example, the person element is a character string such as "I," "she," "husband," "wife," and "parent." The general vocabulary is a character string other than the person's name and person element of a character string included in the text. The "general vocabulary" in a character string associated with a person is conceptually similar to the "general vocabulary" in a character string associated with a place; however, the two have different contents in actuality. Dedicated dictionaries (a name dictionary and a dictionary of person elements) are used for specifying the person's name and a person element, respectively. In other words, a character string associated with a person is determined as to whether it belongs to the person's name or a person element, depending on the character strings registered (described) in the name dictionary and the dictionary of person elements.

Control unit 100 assigns a priority to the character string specified in this step. Specifically, control unit 100 assigns the priority referring address information in the address book in an order described below:
(1) An email address that is included in the fields "From/To/Cc" and that is registered in the address book
(2) An email address that is included in the text and that is registered in the address book
(3) An email address that is included in the fields "From/To/Cc" and that is not registered in the address book
(4) An email address that is included in the text and that is not registered in the address book
(5) An email address (or a telephone number) in a case where the email address (or a telephone number) corresponds to a person's name included in the text, and is registered in the address book
(6) An email address (or a telephone number) in a case where the email address (or a telephone number) corresponds to a person element included in the text, and is registered in the address book
(7) A telephone number included in the text in a case where the telephone number or a corresponding email address does not correspond to the foregoing (1) to (6)
(8) A person's name in a case where the person's name is included in the text, and an email address (or a telephone number) corresponding to the person's name is not registered in the address book
(9) A person element in a case where the person element is included in the text, and an email address (or telephone number) corresponding to the person element is not registered in the address book (10) The general vocabulary In this example, (1) has the highest priority, (10) has the lowest priority. In this example, an email address is presented prior to a telephone number and a name. It is to be noted that when plural person's names and person elements are included in the text, priorities may be determined in a predetermined appropriate order. In addition, when the person's name or a person element is compared with the name in the address book, either the family name or the first name may be used, or they may be compared without regard to a title such as "Mr." and "Ms."

Figure 8:
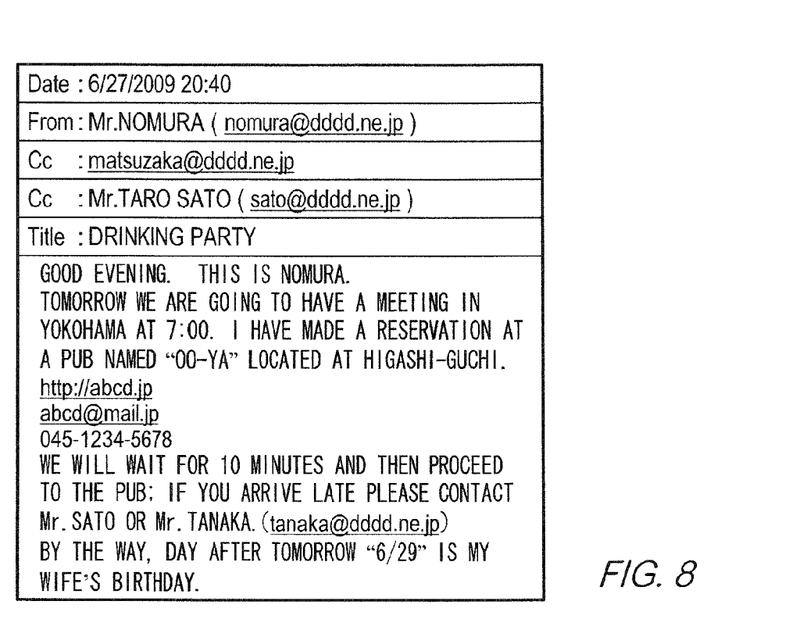
FIG. 8 is a diagram showing an example of an email received by the communication terminal.
Figure 9:
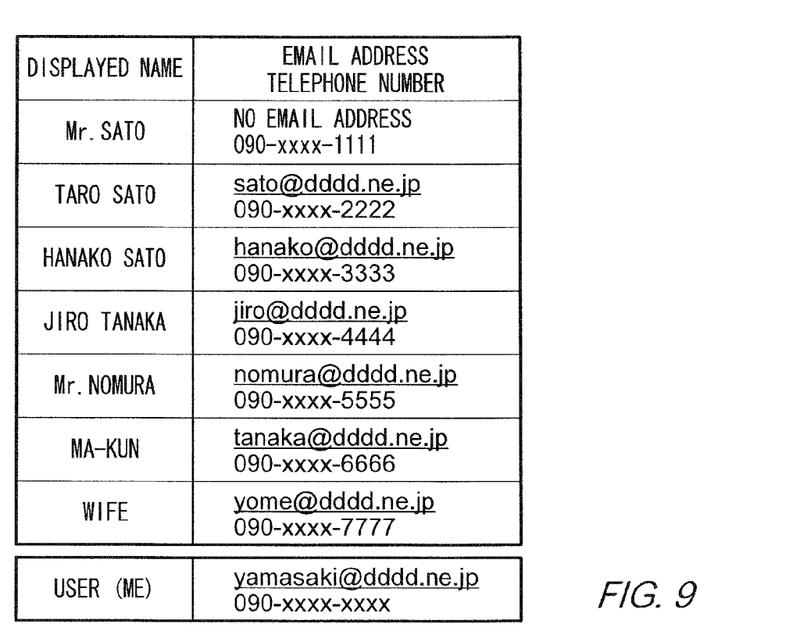
FIG. 9 is a diagram showing an address book stored in the communication terminal.

FIGS. 8 to 16 are diagrams explaining an example of an operation. FIG. 8 is a diagram showing an example of an email received by communication terminal 10 of a user, and FIG. 9 is a diagram showing an address book stored in communication terminal 10. It is to be noted that in this example an email address of the user is "yamasaki@dddd.ne.jp" and a telephone number of the user is "090-xxxx-xxxx."

Figure 10:
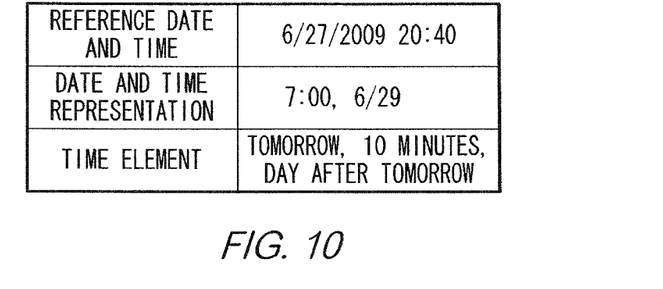
FIG. 10 is a diagram showing character strings associated with a date and time specified from the email exemplified in FIG. 8.
Figure 11:
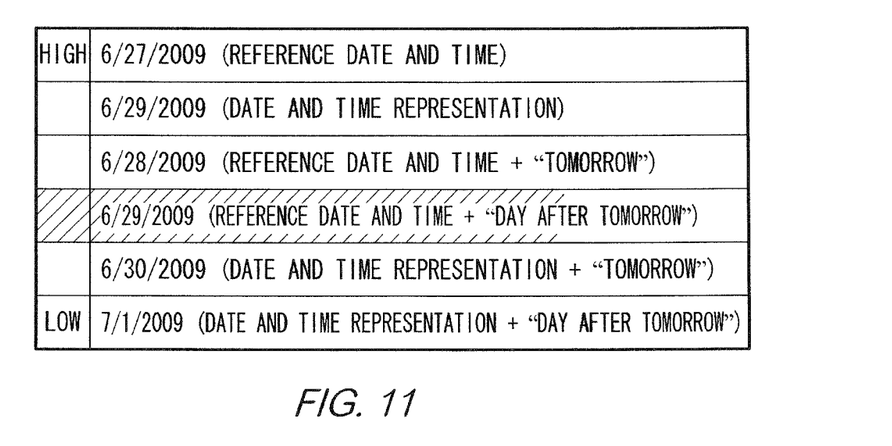
FIG. 11 is a diagram showing priorities of dates (day, month, and year) included in the date and time exemplified in FIG. 10.
Figure 12:
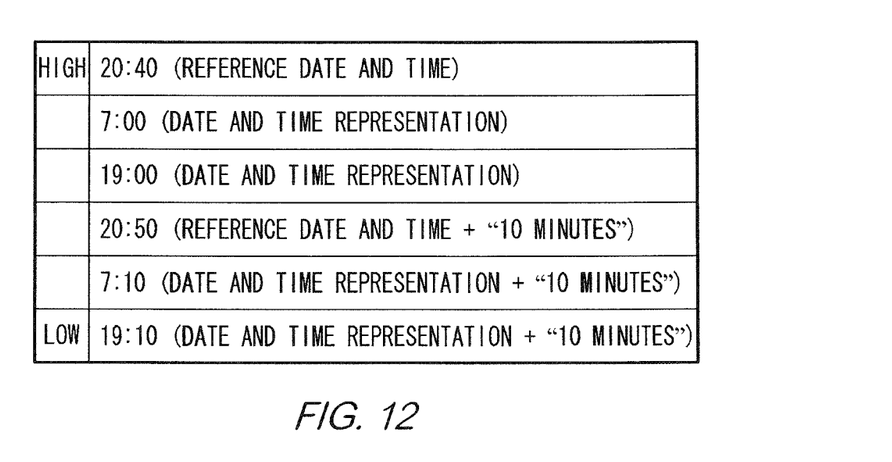
FIG. 12 is a diagram showing priorities of times included in the date and time exemplified in FIG. 10.

FIG. 10 is a diagram showing character strings associated with a date and time, which character strings are included in character strings specified in the email exemplified in FIG. 8. FIG. 11 is a diagram showing priorities of dates (day, month, and year) included in the date and time, FIG. 12 is a diagram showing priorities of times included in the date and time. It is to be noted that in FIG. 11 the character string "6/29/2009 (Jun. 29, 2009)" represents a date of the second date and time representation, and also represents a date that is an addition of the fourth reference time and "day after tomorrow (namely two days after)." When such duplication is raised, control unit 100 performs processing in which a character string with the highest priority of the duplicated character strings is left, and a character string other than the character string that is left (the fourth character string in FIG. 11) is excluded. In this case, the character string "6/30/2009 (Jun. 30, 2009)" will have the fourth highest priority.

In addition, when the specified time cannot be specified as either a.m. or p.m., control unit 100 specifies both a.m. and p.m. time. For example, control unit 100 determines for the date and time representation "7:00" that both times "7:00 (7:00 a.m.)" and "19:00 (7:00 p.m.)" can be represented, and therefore specifies both times. It is to be noted that in the example of FIG. 12 a priority of the a.m. time is higher than a priority of the p.m. time; however, either time may have a priority higher than a priority of another time.

Control unit 100 presents as an input candidate a predetermined number of a character string with a priority higher than a priority of another character string, which character string is included in the character strings to which the priorities are assigned in this manner. Therefore, when the predetermined number of the character string is specified in an order of priority, control unit 100 may terminate the specifying processing without specifying a character string other than the specified character string. For example, in FIG. 11 all character strings associated with a date and time are presented for convenience of explanation; however, when three input candidates are presented, control unit 100 may omit processing to specify character strings on and after the fourth character string. This manner allows control unit 100 to reduce a consumption of a resource.

Figure 13:
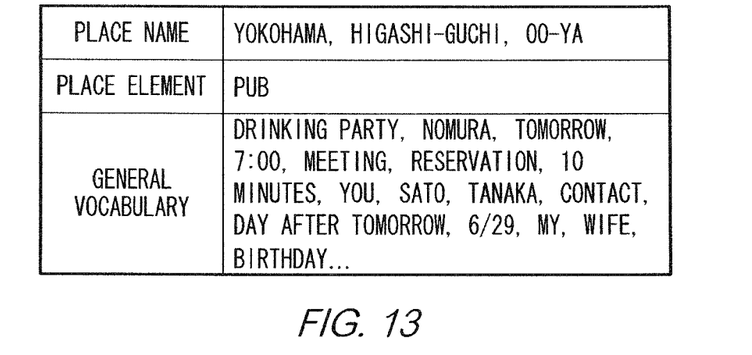
FIG. 13 is a diagram showing character strings associated with a place specified from the email exemplified in FIG. 8.
Figure 14:
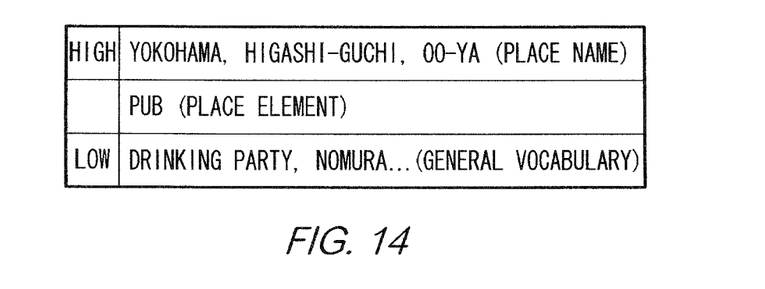
FIG. 14 is a diagram showing priorities of the character strings exemplified in FIG. 13.

FIG. 13 is a diagram showing character strings associated with a place of character strings specified in the email exemplified in FIG. 8. FIG. 14 is a diagram showing priorities of the character strings shown in FIG. 13. It is to be noted that in this example, for character strings "Yokohama," and "Higashi-guchi," a character string with a priority higher than a priority of the other character string may be appropriately determined as described above.

Figure 15:
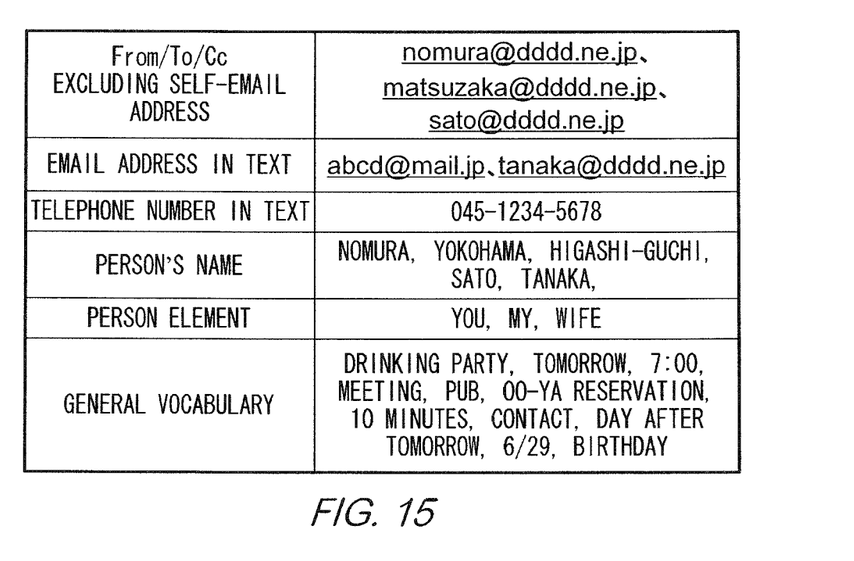
FIG. 15 is a diagram showing character strings associated with a person specified from the email exemplified in FIG. 8
Figure 16:
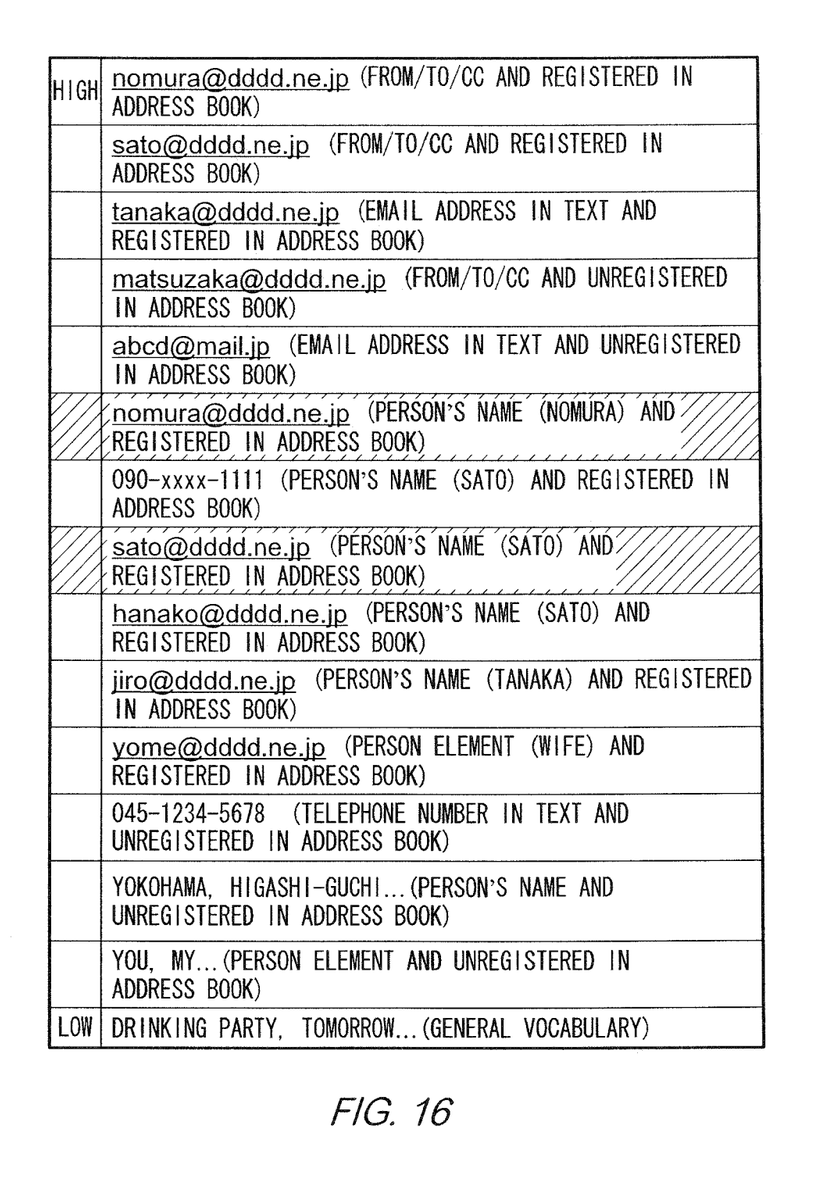
FIG. 16 is a diagram showing priorities of the character strings exemplified in FIG. 15.

FIG. 15 is a diagram showing character strings associated with a person, which character strings are included in character strings specified in the email exemplified in FIG. 8. FIG. 16 is a diagram showing priorities of the character strings shown in FIG. 15. In this example, the character string "nomura@dddd.ne.jp" has the highest priority and also has the sixth priority. In addition, the character string "sato@dddd.ne.jp" has the second priority and eighth priority, accordingly this character string is duplicated. In this case, control unit 100 may exclude either the duplicated character strings, and may move up the priorities of the subsequent character strings.

It is to be noted that FIG. 16 shows the example in which an email address of address information is presented prior to another information. However, control unit 100 may present a telephone number or a name of the address information prior to the email address. For example, in the example shown in FIG. 16 control unit 100 may present as the input candidate the character string such as "Mr. Nomura," "090-xxxx-5555" as a substitute for the character string "nomura@dddd.ne.jp" (refer to FIG. 9).

As described above, according to communication terminal 10 of the present embodiment, it is possible to display as an input candidate a character string that is likely to have a higher association with a content of an email prior to another character string by combining character strings that have a predetermined attribute and that are included in the email, and using the character strings to which priorities are assigned. Therefore, according to communication terminal 10, it can be expected to allow a user to input a character string that is likely to be input by a simpler operation.

[Modification]

The foregoing embodiment and example of the operation are only one example of the present invention. In the present invention, the foregoing embodiment or example of the operation may be carried out in an embodiment to which the following modification is applied. It is to be noted that the following modified examples may be carried out by being combined with each other as necessary.

(Modification 1)

The foregoing email is one example of the electric message according to the present invention. The electric message referred to here, is an electronic message that is exchanged between communication terminals. In the present invention, another electric message may be used as a substitute for the foregoing email. "Another electric message" referred to here is, for example, data sent or received in a Short Message Service (SMS). One of the differences between the email and the SMS is a difference as to whether the address information used for sending or receiving data is an email address or a telephone number. In addition, in the present invention, plural types of electric messages may be used for presenting an input candidate.

It is to be noted that the electric message according to the present invention does not have to be data that includes a send time or receive time. It is sufficient that the electric message is data associated with the send time or receive time. For example, if a communication terminal records the time at which an electric message is sent or received, and stores the time associated with the electric message, the time may be used for the send time or receive time of the electric message.

Further, in the present invention, data used for presenting an input candidate is not limited to an electric message, and also is not limited to data sent or received. The data used for presenting an input candidate may be any data if the data includes date and time information for specifying a reference date and time, and a character string associated with a date and time (other than the date and time information). It is to be noted that if data that is not sent or received is used, a generated time or edited time may be used for the date and time information, for example.

(Modification 2)

The present invention can be applied in a case where a memorandum is generated based on a sent electric message instead of a received electric message. In addition, in the present invention, an input candidate may be presented using a sending and receiving history or incoming and outgoing history, or using the address book and the sending and receiving history or incoming and outgoing history together, instead of using the foregoing address book. In this case, priorities of character strings may be determined such that a character string included in the address book has a priority higher than a priority of a character string included in the sending and receiving history or incoming and outgoing history, or a character string included in both the address book and the sending and receiving history or incoming and outgoing history has a priority higher than a priority of another character string.

(Modification 3)

The present invention may be also understood as a data processing apparatus including; a memory unit that stores address information that is a candidate or history of a source or destination of communications; specifying unit that specifies a character string with a predetermined attribute from an electric message; and presenting unit that presents as an input candidate a character string or address information associated with the predetermined attribute when the specified character string is included in the stored address information, or a communication terminal including the data processing apparatus. According to the data processing apparatus or a communication terminal, it is possible to present as an input candidate a character string associated with a person who is likely to have an association with the user of the communication terminal prior to another character string by using data stored in a memory unit such as an address book.

(Modification 4)

The functions shown in FIG. 3 may be implemented by a cooperation of plural programs. For example, in the functions shown in FIG. 3, date and time specifying unit 130, place specifying unit 140, and person specifying unit 150 may correspond to different programs, respectively. In addition, in the present invention, all character strings associated with a date and time, place, and person do not have to be presented. It is sufficient that just one of the character strings is presented as an input candidate.

(Modification 5)

The present invention may be understood not only as the data processing device and the communication terminal including the data processing device, but also as an input supporting method performed in the data processing apparatus or communication terminal. In addition, the present invention may be understood as a program that causes a computer to implement the functions (or a part of the function) shown in FIG. 3. This program may be provided in the state of being stored in a recording medium such as an optical disk, or may be provided by being downloaded to a computer via a network such as the Internet, and being installed to the computer to make the program available.

The invention claimed is:

1. A data processing apparatus including at least one computer processor, comprising:
   a reference specifying unit that specifies a reference date and time used when an input candidate, which is a set of character strings, associated with a date and time is estimated, based on data including a character string and date and time information;
   a character string specifying unit that specifies a character string associated with a date and time from the character string included in the data;
   an estimating unit that estimates an input candidate associated with a date and time using the date and time specified by the reference specifying unit and the character string specified by the character string specifying unit; and
   a presenting unit that displays input candidates to be selected by a user, the input candidates are estimated by the estimating unit,
   wherein:
   the character string specifying unit specifies a first character string that represents an absolute or direct date and time and a second character string that represents a relative or indirect date and time;
   the presenting unit presents a first input candidate estimated using the first character string and a second input candidate estimated using the second character string such that the first input candidate estimated is selected prior to the second input candidate the presenting unit presents the first input candidate prior to the second input candidate, the presenting unit presents the first input candidate prior to the second input candidate; and
   the estimating unit sets the reference date and time to the first input candidate, and sets a date and time that is a combination of the reference date and time and the specified character string to the second input candidate.

2. The data processing apparatus according to claim 1, wherein a number of input candidate presented by the presenting unit is restricted to a predetermined amount.

3. An input supporting method performed by a data processing apparatus, the method comprising:
   specifying a reference date and time used when an input candidate, which is a set of character strings, associated with a date and time is determined, based on data including a character string and date and time information;
   specifying a character string associated with a date and time from the character string included in the data;
   estimating an input candidate associated with a date and time using the specified date and time and the specified character string;
   presenting estimated input candidates to a user for selection by the user; specifying a first character string that represents an absolute or direct date and time and a second character string that represents a relative or indirect date and time; and
   presenting a first input candidate estimated using the first character string and a second input candidate estimated using the second character string such that the first input candidate estimated is selected prior to the second input candidate, the first input candidate presented prior to the second input candidate; and
   setting the reference date and time to the first input candidate, and setting a date and time that is a combination of the reference date and time and the specified character string to the second input candidate.

4. The input supporting method according to claim 3, wherein a number of input candidate presented is restricted to a predetermined amount.

5. A computer program embodied in a non-transitory computer-readable medium for causing a computer to perform the steps of:
- specifying a reference date and time used when an input candidate, which is a set of character strings, associated with a date and time is determined, based on data that includes a character string and date and time information;
- specifying a character string associated with a date and time from the character string included in the data;
- estimating an input candidate associated with a date and time using the specified date and time and the specified character string;
- presenting estimated input candidates to a user for selection by the user; specifying a first character string that represents an absolute or direct date and time and a second character string that represents a relative or indirect date and time; and
- presenting a first input candidate estimated using the first character string and a second input candidate estimated using the second character string such that the first input candidate estimated is selected prior to the second input candidate, the first input candidate presented prior to the second input candidate; and
- setting the reference date and time to the first input candidate, and setting a date and time that is a combination of the reference date and time and the specified character string to the second input candidate.

6. The computer program according to claim 5, wherein a number of input candidate presented is restricted to a predetermined amount.

* * * * *